April 4, 1950 W. E. BENNETT 2,502,817
COTTON HARVESTER
Filed Feb. 12, 1946 3 Sheets-Sheet 1

INVENTOR.
W. E. Bennett,
BY Victor J. Evans & Co.
ATTORNEYS

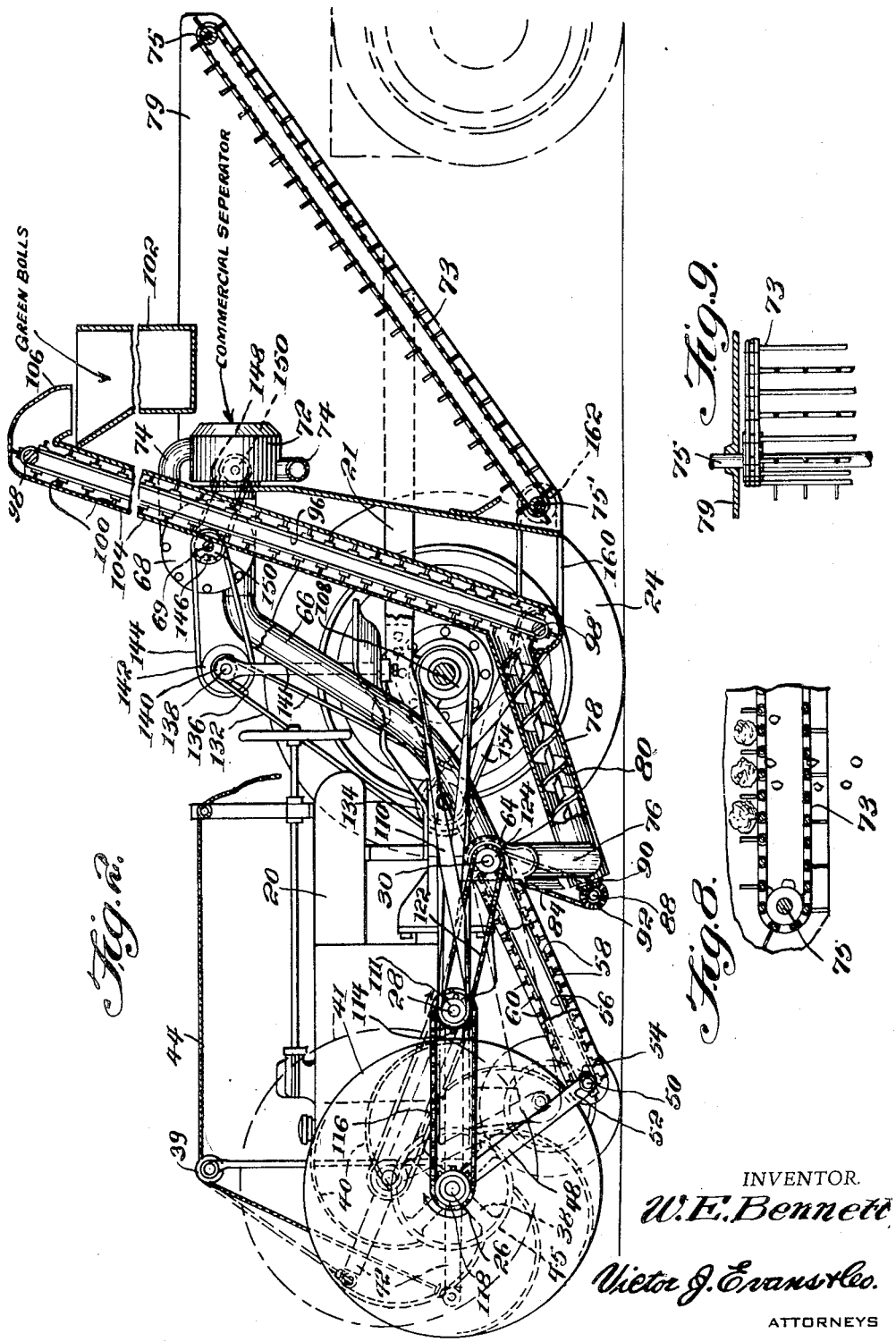

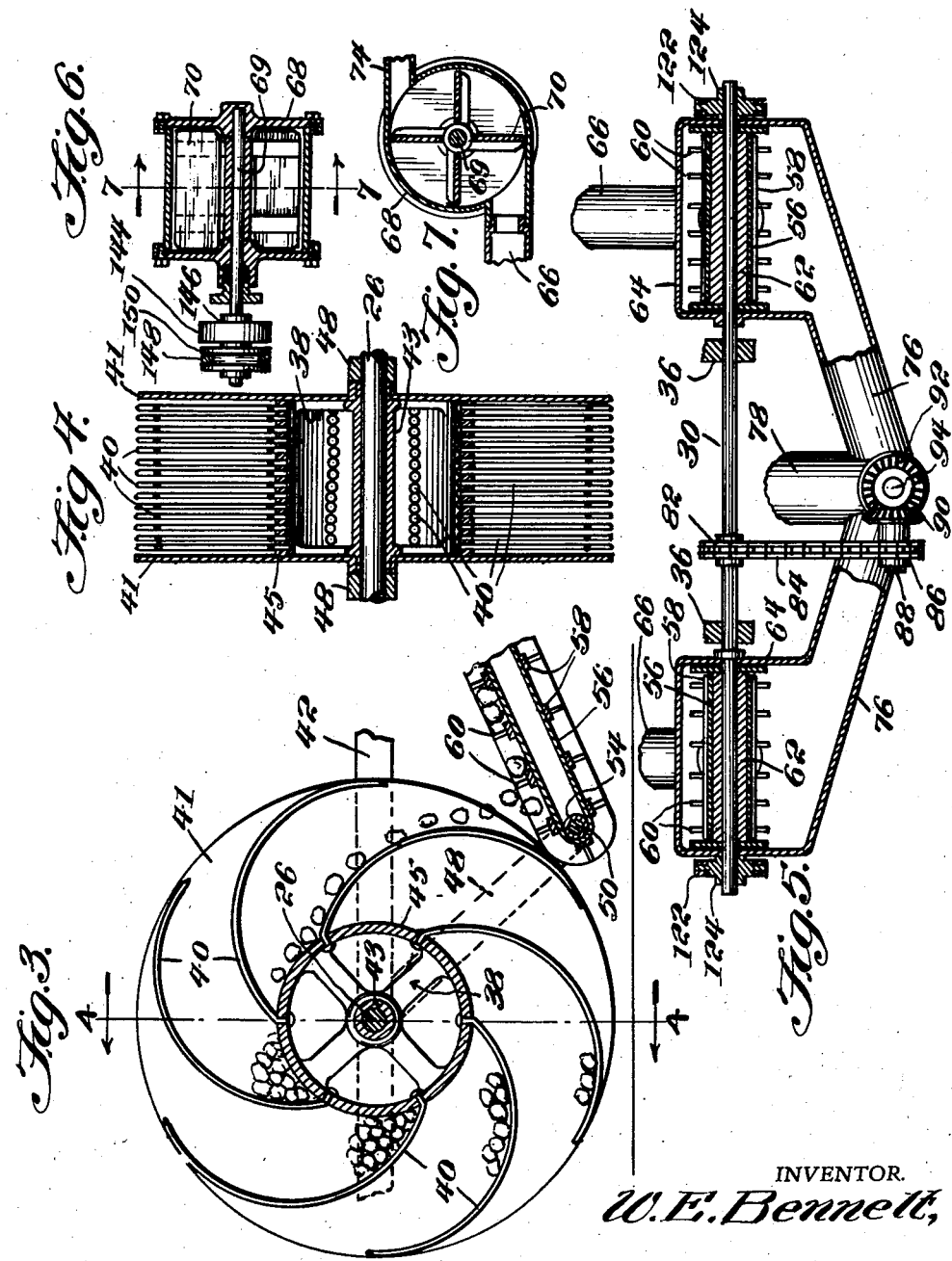

Patented Apr. 4, 1950

2,502,817

UNITED STATES PATENT OFFICE 2,502,817

COTTON HARVESTER

William E. Bennett, Littlefield, Tex.

Application February 12, 1946, Serial No. 646,979

1 Claim. (Cl. 56—12)

This invention relates to a cotton harvester, and more especially to one that can be mounted on a tractor.

The main object of the invention is the provision of a device that will pick the cotton from the plants and separate the green bolls from the cotton by means of suction.

Another object of the invention is to provide a device that picks the cotton from the plants and after separating it, discharges the cotton into a vehicle.

This invention also consists in certain other features of construction and in the combination and arrangement of the several parts to be hereinafter more fully described and illustrated in the accompanying drawings and specifically pointed out in the appended claim.

In describing the invention in detail, reference will be had to the accompanying drawings, wherein like characters denote like or corresponding parts throughout the several views, and in which:

Figure 2 is a side view thereof with parts broken away and parts in section.

Figure 3 is an enlarged, vertical, sectional view of the cotton picking wheel or drum.

Figure 4 is an enlarged, vertical sectional view on the line 4—4 of Figure 3.

Figure 5 is an enlarged detailed view with parts broken away and parts in section of the suction device for separating the cotton from the green bolls.

Figure 6 is an enlarged sectional view of the fan.

Figure 7 is an enlarged sectional view taken on the line 7—7 of Figure 6.

Figure 8 is an enlarged detailed section of the side of one of the conveyors.

Figure 9 is an enlarged detailed section of the top of the same, and

Figures 1, 10:
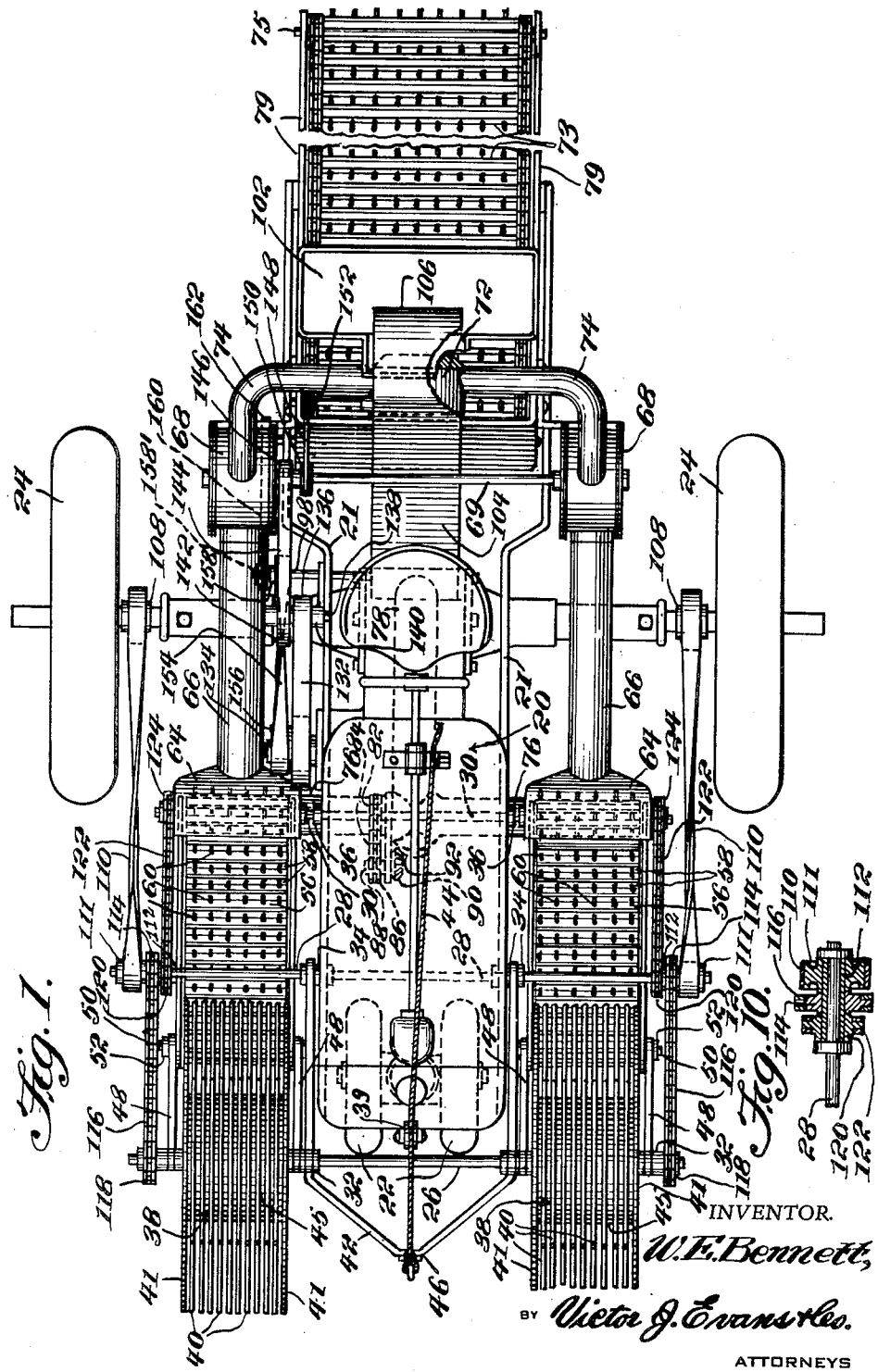
Figure 1 is a top plan view of an embodiment of the invention.
Figure 10 is an enlarged sectional view of the pulley sleeve.

Referring now more particularly to the drawings, 20 designates a tractor having front wheels 22 and rear traction wheels 24, upon which the harvester is mounted by means of a frame 21 which frame comprises the rearwardly extending parallel alined side bars 21. Transverse parallel shafts 28 and 30 are journalled in bearings 34 and 36 positioned on opposite sides of the tractor 20 on the frame 21. A shaft 26 carries a pair of spaced circular drums 38 having arcuate fingers 40 thereon for gathering the cotton from the plants. Circular plates 41 are connected to the shaft housings 43 of the drums 38 and are positioned on the periphery 45 of the drums 38 and inclose the drums 38 and fingers 40. The bearings 32 in which the shaft 26 is journalled are mounted on a substantially U-shaped support 42 pivotally mounted on the shaft 28.

A rope 44 trained over pulleys 39 is connected to the apex 46 of the frame 42 and controls the height of the fingers 40 from the ground.

Arms 48 pivotally mounted on shaft 26 are adapted to support a shaft 50 journalled in bearings 52.

Rollers 54 are secured to shaft 50 and a belt conveyor 56, having slats 58 provided with upstanding fingers 60, connected thereto, is trained over the rollers 54 and roller 62 is secured to shaft 30.

The conveyor 56 is positioned to and slightly under the rear of the drum 38 in order to receive the cotton and bolls when stripped from the plant by the fingers 40.

Hoods 64 surround the end of the conveyor 56 and has pipes 66 connected thereto at the rear thereof. The pipes 66 in turn are connected to a fan housing 68 in which is positioned a fan 70 mounted on a shaft 69. The fan housing 68 is connected to a commercial separator 72 by means of angular pipes 74.

Therefore, when the cotton and bolls come within the confines of the hood 64, the cotton is drawn into the pipes 66 by suction created by the fan 70 and then into the separator 72.

The cotton, upon leaving the separator 72, drops onto an upwardly inclined conveyor 73 and is discharged from the conveyor 73 into a vehicle. The upper end of the conveyor is trained over shafts 75, each end of which is journalled in the rear end of the sides of the hopper, which sides at their lower ends support the lower end of the conveyor 73 while the front wall 79' of the hopper supports the separator 72. The lower end of the conveyor 73 is trained over the shaft 75' which is journalled in the sides 79 of the hopper which are connected to the frame 21.

The hoods 64 have inclined pipe portions 76 which are connected to an upwardly inclined pipe 78 having an auger conveyor 80 positioned therein.

The shaft 30 is provided with a sprocket gear 82 and a sprocket chain 84 is trained over sprocket 82 and a sprocket gear 86, mounted at the junction of the pipe portions 76 and pipe 78 on a stub axle 88.

The stub axle 88 has a bevel gear 90 secured thereto, which meshes with another bevel gear 92 secured to shaft 94 of the auger conveyor 80.

When the cotton is drawn into the pipe 66, the bolls being heavier than the cotton fall into the pipe portions and are conveyed upwards by the auger conveyor 80.

Positioned at the end of conveyor 80 is an upwardly inclined conveyor 96 which is trained over shafts 98 and 98' respectively.

The conveyor 96 is provided with upstanding fingers 100 which carry the bolls upwardly and deposit them in a container 102 positioned below the upper end of the conveyor 96.

The conveyor 96 is inclosed in a casing 104 which has a downwardly inclined discharge end 106 positioned over the container 102.

Power for operating the machine is derived from take off pulleys 108 which are secured to the axle on opposite sides of the tractor 20.

Belts 110 are trained over the pulleys 108 and pulleys 111 which are secured to loosely mounted sleeves 112 on shaft 28.

Sprocket gears 114 are also secured to sleeves 112 and contact the pulley 110. Sprocket chains 116 are trained over sprocket gears 118 secured to the sides of the shaft 26. In this manner, power is transmitted to and rotates the drums 38.

A second sprocket gear 120 is secured to sleeves 112 and contacts the sprocket gear 114 and sprocket chains 122 are trained over the sprocket gear 120 and a sprocket gear 124 secured to the upper shaft 30 of the conveyor 56.

In this manner power is transmitted to and operates the conveyors 56 and 80.

A belt 132 is trained over the power take off 134 of the tractor 20 and a pulley 136 secured to a shaft 138 is journalled in bearings 140 in support 141 connected to the frame 21. A second pulley 142 is secured to the shaft 138 and a belt 144 is trained over the pulley 142 and the pulley 146 which is secured to shaft 69 of the fan 70. A belt 148 is trained over a second pulley 150 secured to shaft 69 and a pulley 152 of the separator 72.

In this manner power is transmitted to and operates the fan 70 and separator 72.

A belt 154 is trained over a pulley 156 secured to the shaft of the power take off 134 and a pulley 158 secured to the lower shaft 98 of the conveyor 96.

A belt 160 is trained over pulley 158' and pulley 162 secured to the lower shaft 75 of the conveyor 73.

In this manner power is transmitted to the conveyors 75 and 96.

From the foregoing, it will be seen that there is provided a device for picking or gathering the cotton from the plants having means for separating the cotton from the bolls by suction and means for elevating the bolls to a container and the cotton into a vehicle and means for separating the cotton before it enters the vehicle.

It is thought from the foregoing description that the advantageous novel features and operation of the device will be readily apparent.

It is to be understood that changes may be made in the construction and in the combination and arrangement of the several parts, provided that said changes fall within the spirit of the invention and the scope of the appended claim.

Having thus described the invention, what is claimed as new and desired to be secured by Letters Patent is:

A cotton harvesting machine comprising a pair of horizontally disposed parallel side bars constituting a frame structure that is adapted to straddle a row of plants, a shaft mounted in said side bars transversely of said machine, a substantially U-shaped support pivotally mounted on said shaft; means for adjusting the height of said support, a second transverse shaft mounted in the forward end of said support, rotatable cotton picking drums mounted on said second shaft, depending fingers on said drums, chain drive connections between said first and second shafts, arms pivotally mounted on said second shaft in depending relation thereto, a third shaft mounted at the lower ends of said arms, a fourth shaft mounted in said side bars, an endless conveyor mounted on said third and fourth shafts so that the lower forward end of said conveyor is adjacent said cotton picking drums for receiving the cotton therefrom, chain drive connections between said first shaft and said fourth shaft a power drive connection with said first shaft for the simultaneous rotation of all of said shafts, and suction means coacting with the upper rear end of said conveyor to dispose of cotton deposit on said conveyor by said drums.

WILLIAM E. BENNETT.

REFERENCES CITED

The following references are of record in the file of this patent:

UNITED STATES PATENTS

| Number | Name | Date |
|---|---|---|
| 796,207 | Harbour | Aug. 1, 1905 |
| 1,449,869 | Novak | Mar. 27, 1923 |
| 1,638,867 | Melton | Aug. 16, 1927 |
| 1,727,774 | Houghton | Sept. 10, 1929 |
| 1,778,587 | Crumley | Oct. 14, 1930 |
| 1,798,883 | Hunter et al. | Mar. 31, 1931 |
| 1,842,737 | Tharpe | Jan. 26, 1932 |
| 1,926,338 | Johnston | Sept. 12, 1933 |